United States Patent Office 2,907,480
Patented Oct. 6, 1959

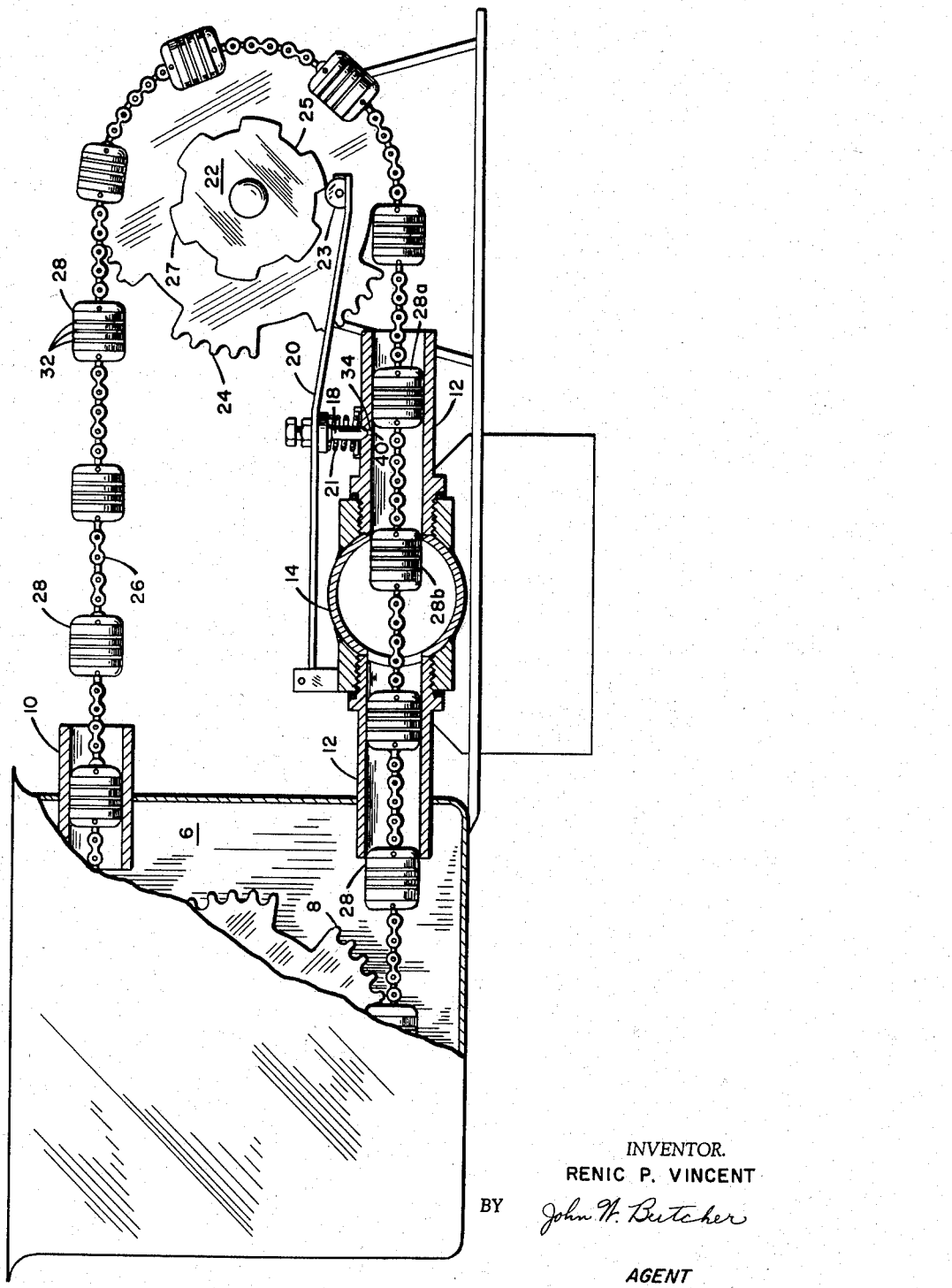

2,907,480

SOLIDS INJECTION INTO PRESSURE SYSTEM

Renic P. Vincent, Tulsa, Okla., assignor to Pan American Petroleum Corporation, Tulsa, Okla., a corporation of Delaware Application January 10, 1958, Serial No. 708,098

11 Claims. (Cl. 214—17)

This invention relates to conveyors and, in particular, to conveyors adapted to transport material into a high-pressure chamber.

A conveyor of this nature may include one or more receptacles which pass from a material transferring relationship with a hopper through a housing and then into material transferring relationship with a high-pressure chamber. From the high-pressure chamber the receptacles pass through the housing and back into the feed hopper.

This invention may be briefly described as a pressure relief valve for a conveyor housing. The valve includes a valve plunger which when in a closed position conforms to the inner surface of the housing to provide a pressure-tight fit about the receptacle. The receptacle is normally formed by one or more carriers that define an enclosure for receipt of material. The valve is closed during the period of time the carrier body is passing across the valve port and is thereafter opened. Opening this valve vents the high-pressure fluid within the housing and within the receptacle to the low-pressure side of the housing.

Venting the volume of fluid within the receptacle while the carrier is within the housing decreases the load on the carrier rings. This eliminates a sudden change of pressure as the carrier emerges from the housing, which change normally tends to distort the rings and thus shorten the life of the rings.

The present invention will be further illustrated by reference to the drawing in which:

The drawing is a view, partially in cross-section, of an endless chain conveyor in combination with a pressure relief assembly.

Referring to Figure 1, an open-top feed hopper 6 is provided with an idler sprocket 8, a guide member 10, and a housing 12. The arrangement of the apparatus is such that the housing 12 in combination with the carriers 28 serves as a seal within the lower portion of the feed hopper 6 and an entrance and exit seal for the high-pressure chamber 14. A driver sprocket 24 in alignment with the housing furnishes the power to actuate the endless chain conveyor assembly. The chain 26 and carriers 28 pass over the driver sprocket, through the guide 10, over the idler sprocket 8, and through pressure chamber 14.

The tolerance between the outside diameter of the carrier and the inside diameter of the housing may be as small as a few thousandths of an inch. The cylindrical portion of each carrier is provided with circumferential recesses. Rings 32 are provided within the recesses. The rings may be slightly deformed as the carrier passes through the housing to insure a pressure-tight fit.

A pressure relief valve including a valve plunger 18, an arm 20, and a cam 22, is provided in combination with the housing 12. When the valve plunger 18 is in its lowermost (closed) position the lower end 40 forms an integral part of the inside surface of the housing.

In operation the feed hopper 6 is filled with a material to a point considerably above the housing and the drive sprocket 24 is actuated. The material in the feed hopper 6 tends to gravitate into the end of the seal 12 between carriers and is transported into the high-pressure chamber 14. As the pistons assume the position as shown in Figure 1 the pressure within the housing between carrier 28a and carrier 28b is substantially the same as the pressure within the high-pressure chamber 14. As the trailing edge of the front carrier 28a clears port 34, the leading edge of the rear carrier 28b has previously entered the housing. Then the follower 23 on arm 20 drops into the recess 25 on cam 22 which permits spring 21 to lift valve plunger 18. This releases the pressure within the housing between the two carriers. The valve plunger 18 is closed by the raised section 27 of cam 22 actuating the follower 23. The section 27 of cam 22 preferably actuates the follower prior to the time the leading edge of rear carrier 28b contacts port 34.

A preferred embodiment of the present invention includes a housing which has a length of about twice the maximum spacing between carriers. The distance from the high-pressure end of the housing to the pressure relief valve is greater than the maximum spacing between carriers. With this arrangement there is always a carrier between the valve and the chamber. This prevents direct communication between the chamber and the atmosphere regardless of the position of the valve plunger.

It is generally preferred to maintain the valve closed from the time the leading edge of a carrier contacts the valve port until the trailing edge of the carrier passes over the port. This allows the valve plunger to form a continuous or smooth internal surface of the housing and to provide a substantially continuous contact between the rings and the housing. It is preferable to vent the pressure within the housing to substantially the pressure outside the housing.

While in the foregoing there have been shown and described preferred embodiments of the method and apparatus of the present invention, it is to be understood that minor changes in the steps and operations involved, and in the details of construction, combination and arrangement of parts may be resorted to without departing from the spirit and scope of the invention. This invention may be used in combination with any conveyor wherein a carrier forms a receptacle for carrying material and the receptacle forms a fluid-tight fit with a housing as the receptacle passes out of material transferring relationship with a high-pressure chamber.

I claim:

1. An apparatus for injecting material into a high-pressure chamber including a low pressure hopper adapted to hold said material; a housing connected to said high-pressure chamber; a carrier adapted to form a receptacle; means to move said carrier from material transferring relationship with said hopper into and out of material transferring relationship with said high-pressure chamber; said housing forming a seal about said receptacle as said receptacle moves from said material transferring relationship with said hopper into and out of said material transferring relationship with said high-pressure chamber; and means to maintain said seal while simultaneously venting said housing and said receptacle to substantially the same pressure within said low-pressure hopper.

2. An apparatus for injecting material into a high-pressure chamber including a hopper at substantially atmospheric pressure adapted to hold said material; a carrier defining a receptacle; a housing in combination with said high-pressure chamber allowing said receptacle to pass into and out of said high-pressure chamber; means to move said receptacle first into communication with said hopper, second into said housing, third into communication with said high-pressure chamber, and fourth back into said housing, and fifth back into communication with said hopper; said housing defining a seal about said receptacle as said receptacle moves into and out of said high-pressure chamber; and means to maintain said seal while simultaneously equalizing the pressure within said receptacle with atmospheric pressure while said receptacle is within said housing and is moving back toward communication with said hopper.

3. An apparatus for transferring material from a hopper to a high-pressure chamber comprising a hopper, a high-pressure chamber, a tubular housing in fluid communication with said high-pressure chamber, a carrier, means to cycle said carrier between said hopper and said high-pressure chamber through said tubular housing and transfer material from said hopper to said high-pressure chamber, a fluid seal between said carrier and said housing, a fluid outlet in the wall of said housing, and means to open said fluid outlet and relieve the pressure within said carrier without destroying said fluid seal while said carrier is within said tubular housing and cycling out of said high-pressure chamber.

4. An apparatus for transferring material from a low-pressure zone to a high-pressure zone comprising a hopper at substantially atmospheric pressure, a chamber at a pressure above the pressure of said hopper, a tubular housing in fluid communication with said chamber, a carrier, means to place said carrier in communication with said hopper to fill said carrier from said hopper, means to empty said carrier into said chamber, means to cycle said carrier between said hopper and said chamber through said tubular housing and transfer material from said hopper to said chamber, a fluid seal between said carrier and said housing, a fluid outlet in the wall of said housing, and means to open said fluid outlet and relieve the pressure within said carrier without destroying said fluid seal while said carrier is within said tubular housing and cycling out of said chamber.

5. An apparatus for transferring material from a low-pressure zone to a high-pressure zone comprising a hopper at substantially atmospheric pressure, a chamber at a pressure above the pressure of said hopper, a tubular housing in fluid communication with said chamber, a carrier, an opening in said carrier for filling and emptying said carrier, means to place said carrier in fluid communication with said hopper to fill said carrier from said hopper, means to empty said carrier into said chamber, means to cycle said carrier between said hopper and said chamber through said tubular housing and thereby transfer material from said hopper to said chamber, a fluid outlet in the wall of said housing, means to form a fluid seal around said opening when said opening is in fluid communication with said outlet, and means to open said fluid outlet and equalize the pressure within said carrier with said low-pressure zone while said opening is in fluid communication with said fluid outlet and cycling out of said chamber.

6. An apparatus for injecting material into a high-pressure chamber including a hopper adapted to hold said material, a plurality of spaced carriers, a housing extending from said hopper into and out of said high-pressure chamber, said housing arranged to form a fluid-tight fit about said carriers, means to move said carriers from said hopper through said high-pressure chamber by way of said housing, and a pressure relief assembly within said housing adapted to vent the housing between adjacent carriers while maintaining said fluid-tight fit as said carriers are emerging from said high-pressure chamber.

7. A pressure relief assembly for a conveyor wherein a plurality of carriers pass through a housing including a valve having a port within said housing, said valve including a plunger adapted to close said port and form a continuous smooth internal surface in said housing when said valve is in a closed position and adapted to open said port and vent said housing when said valve is in an open position, means to close said valve when said carriers are in contact with said port and to open said valve when said carriers are not in contact with said port.

8. An apparatus in combination with a conveyor and a high-pressure chamber, said conveyor having a plurality of carriers having spaces therebetween including a housing having a first end in communication with said high-pressure chamber and a second low-pressure end, a valve in combination with said tubular element arranged to vent a portion of the tubular element, said valve located remote from said high-pressure chamber a distance in excess of the maximum spacing between said carriers, and means to close said valve when said carriers are in contact with said port and to open said valve when said carriers are not in contact with said port.

9. An apparatus in combination with a conveyor and a high-pressure chamber, said conveyor having a plurality of carriers having spaces therebetween, including a housing having a first end in communication with said high-pressure chamber and a second end in communication with the surrounding atmosphere, a valve in combination with said housing arranged to vent said housing, said valve located within said housing a distance from said high-pressure chamber in excess of the maximum spacing between said carriers, and means to close said valve when said carriers are in contact with said port and to open said valve after said carriers pass across said port.

10. A seal assembly for an endless chain conveyor including a housing, a plurality of carriers equally spaced on an endless chain, a valve within said housing forming a continuous smooth internal surface of said tubular member, said carriers arranged to pass through said housing and across said valve, means to close said valve when said carriers are in contact with said valve and to open said valve after said carriers pass across said valve.

11. An apparatus for injecting material into a high-pressure chamber including a hopper, a carrier defining a receptacle, means to move said receptacle from said hopper into and out of said high-pressure chamber, a housing defining a seal about said receptacle as said receptacle moves into and out of said high-pressure chamber, a fluid outlet in the wall of said housing, and means to open said fluid outlet to relieve the pressure within said receptacle and to maintain said seal while said receptacle is within said housing and is moving out of said high-pressure chamber.

References Cited in the file of this patent

UNITED STATES PATENTS

| | | |
|---|---|---|
| 1,100,992 | Sallee | June 23, 1914 |
| 2,609,250 | Hapman | Sept. 2, 1952 |